May 30, 1967  S. G. L. ANDERSSON  3,323,016
TRANSFORMER DIFFERENTIAL PROTECTION
Filed Nov. 16, 1964
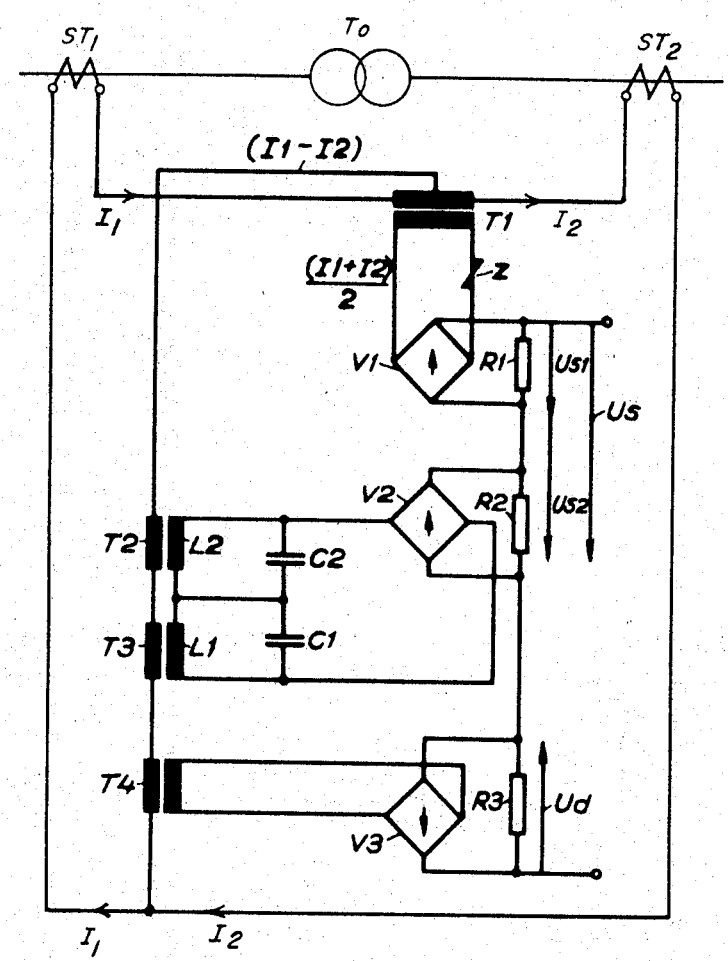
INVENTOR.
STIG GÖSTA LENNART ANDERSSON
BY
Bailey, Stephens & Huettig

United States Patent Office 3,323,016
Patented May 30, 1967

3,323,016
TRANSFORMER DIFFERENTIAL PROTECTION
Stig Gösta Lennart Andersson, Vasteras, Sweden, assignor to Allmänna Svenska Elektriska Aktiebolaget, Vasteras, Sweden, a corporation of Sweden
Filed Nov. 16, 1964, Ser. No. 411,325
Claims priority, application Sweden, Nov. 20, 1963, 12,787/63
1 Claim. (Cl. 317—15)

A differential protection device for transformers is usually built on the principle that the sum and the difference of the currents which go to and from a transformer are formed. The difference current operates in the tripping direction and the sum current in the stabilizing direction on the protection device. A certain difference current exists all the time because of losses in the transformer, even with normal loading of a fault-free transformer, so that the protection device must be so adjusted that the difference current will rise above a certain threshold value before tripping. With over current, the difference current also rises and it is therefore necessary to introduce a releasing stabilization for the over-current. For this the sum current is used and a magnitude proportion to the sum current is used for stabilization.

Upon connection of a transformer, a strong increase of the difference current arises and the protection device must therefore be stabilized against unwanted tripping caused by this increase. Many solutions of the problem have been put forward, among others the use of a filter for filtering out the second harmonic which occurs strongly in the current intensity when connection is made. The filtered harmonics are rectified and are used as the stabilization magnitude. Other ways of stabilizing for tripping upon connection of the transformer are also known.

The present invention relates to a connection and over-voltage stabilization circuit for transformer differential protection, where the stabilization is based on the proportion of the harmonics in the difference current. It has been shown that upon over-voltage the proportion of the fifth harmonic in the differential current increases and, by filtering from this and using it as a stabilization magnitude, the tripping of the protection device upon over-voltage on the fault-free transformer is prevented. The invention is characterized by a band pass filter for the second harmonic for connection stabilization and a band pass filter for the fifth harmonic for over-voltage stabilization, and by the fact that the two filters are dimensioned in such a way that they block the third harmonic by means of which unwanted stabilization for inner transformer faults is avoided. With the proposed filter circuit, a transformer differential protection device is produced which is insensible to the difference currents which occur upon connection and over-voltage, but which react to inner transformer faults, even if they given the difference current a high proportion of the third harmonic.

On the accompanying drawing a differential protection device according to the invention can be seen.

In the figure, $T_0$ is the transformer to be protected. On each side of this transformer there is a current transformer $ST_1$ and $ST_2$. The secondary currents $I_1$ and $I_2$ from these two transformers are fed to the primary winding of a transformer $T_1$. The current $I_1$ is proportional to the current on the one side of transformer $T_0$ and the current $I_2$ is proportional to the current on the other side of the transformer $T_0$. A current proportional to $I1+I2/2$ is taken from the secondary winding of the transformer T1 and fed to a rectifier connection V1 over a voltage dependent resistance Z. Across the D.C. outlet of the rectifier connection a resistor R1 is connected and by means of this a voltage $Us1$ occurs over the resistor. This voltage is shown in the figure in a downward direction by which it is understood that it operates in a stabilizing direction. By a suitable choice of the non-linear resistor Z and possibly in combination with a linear resistor, the equation $$Us1 = f\left(\frac{I1+I2}{2}\right)$$

is given a suitable form, so that the voltage $Us1$ during all ratios operates in a way to stabilize against tripping because of over-current.

From a center point on the primary winding of the transformer T1 a difference current $I1-I2$ is tapped in a known way. It is supplied in series to the primary windings of three transformers T2, T3 and T4.

Upon an inner fault in the protected transformer the difference current $I1-I2$ increases. This current is taken out over the transformer T4, rectified in the rectifier bridge V3 and supplied to the resistor R3, over which a voltage $Ud$ is generated which operates in a releasing direction on the protection device and therefore is directed opposite to the voltage $Us1$ previously shown.

Upon connection of a transformer a strong difference current occurs. If no measures are taken the voltage $Ud$ increases greatly and the protection device is tripped, even if the transformer is fault-free. In order to prevent this, the protection device must be stabilized against tripping because of the current intensity during connection. Connection stabilization is based upon the connection current and therefore also upon the difference current which contains a high degree of second harmonics. The transformer protection device is therefore provided with a band pass filter L2, C2 for the second harmonics. The strong current intensity of the second harmonics which occurs during a connection is rectified in a bridge V2 and is supplied to a resistor R2 so that a voltage $Us2$ is generated across the resistor in a stabilizing direction. Both the stabilizing voltages $Us1$ and $Us2$ are combined into a stabilizing voltage $Us$. As long as this voltage is greater than the voltage $Ud$ operating in the tripping direction, the protection device is stabilized towards tripping.

The protection device is also stabilized for a strong increase of the difference current upon over-voltage. Upon over-voltage the strength of the fifth harmonic of the difference current will increase. By arranging a band filter which consists of the secondary winding L1 of the transformer T3 and the condenser C1 and which transmits the fifth harmonic, a voltage $Us2$ is obtained across the rectifier bridge V2 and the resistor R2, which gives stabilization in the same way as described for the connection current intensity.

In certain types of internal faults, the difference current contains a high proportion of third harmonics. If no special measures are taken, the filter circuits L1, C1 and L2, C2 will transmit a considerable part of said harmonics, which then will operate in a stabilizing way even upon an internal fault, for which the protection device will trip. According to the invention therefore, the filter circuits L1, C1 and L2, C2 are so dimensioned that the first gives stabilization during connection and the second upon over-voltage, while the circuits together block the third harmonics and thereby prevent unwanted stabilization upon the occurrence of faults, which give a high proportion of the third harmonic in the difference current.

The difference voltage $Ud-Us$ produced, which operates in the tripping direction, is fed to a polarized voltage sensitive means which in its turn controls a relay in a way known in itself.

What is claimed is:

In a voltage generating device in an equipment for protecting apparatus connected in an alternating current power system, said device comprising means for deriving from said system a first varying current dependent upon the sum of the currents flowing into and out of said apparatus, means for deriving from said system a second varying current dependent upon the difference of the currents flowing into and out of said apparatus, means for generating a first and a second direct voltage dependent upon said derived currents, the combination with all said means of a filter device connected to said means for deriving from said system a second varying current dependent upon the difference between the currents flowing into and out of said apparatus, said filter device comprising a pass filter for the second harmonic and a pass filter for the fifth harmonic, a block filter for the third harmonic, said two pass filters being connected together to said block filter, means for generating a third direct voltage dependent upon the output of said filter device, means for combining said first and third voltages to form a restraint voltage, a releasing circuit connected to said voltage generating device, and means to supply to said releasing circuit a tripping voltage equal to the difference between said restraint voltage and said second voltage.

References Cited

UNITED STATES PATENTS

| | | | |
|---|---|---|---|
| 2,863,100 | 12/1958 | Rice | 317—27 |
| 3,144,590 | 8/1964 | Sharp et al. | 317—14 |

MILTON O. HIRSHFIELD, *Primary Examiner.*

R. V. LUPO, *Assistant Examiner.*